A. WILSON.
Driven Wells.

No. 140,665.

Patented July 8, 1873.

Witnesses:
A. W. Almqvist
C. Sergnielo

Inventor:
A. Wilson
Per
Munn & Co.
Attorneys.

UNITED STATES PATENT OFFICE.

ALPHONSO WILSON, OF PLAINFIELD, NEW JERSEY.

IMPROVEMENT IN DRIVEN WELLS.

Specification forming part of Letters Patent No. 140,665, dated July 8, 1873; application filed May 5, 1873.

*To all whom it may concern:*

Figure 1:
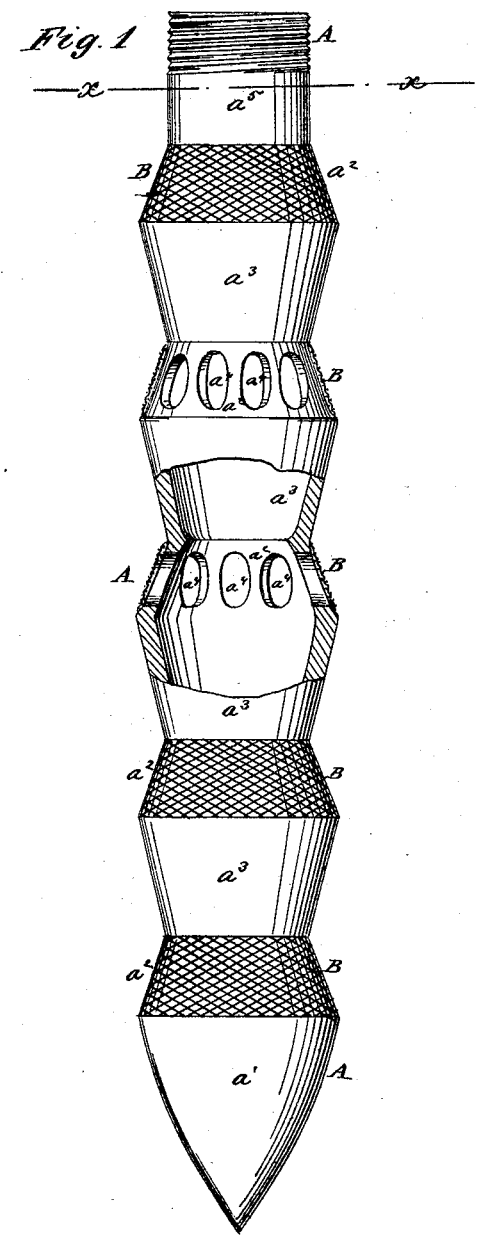
Figure 2:
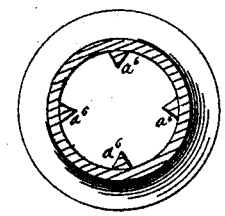

Be it known that I, ALPHONSO WILSON, of Plainfield, in the county of Union and State of New Jersey, have invented a new and useful Improvement in Drive-Wells, of which the following is a specification:

Figure 1 is a side view of the water-section of a drive-well tube illustrating my invention, part being broken away to show the construction. Fig. 2 is a cross-section of the same taken through the line $x\ x$, Fig. 1.

Similar letters of reference indicate corresponding parts.

My invention has for its object to improve the construction of drive-well tubes so that the wire-gauze cannot be cut or torn off, while the tube is being driven, by stones or other obstructions. The invention consists in a water-section of a drive-well tube cast of malleable iron with a conical point, alternate contracting and expanding ring-sections, and a tubular top section, and having its contracting sections perforated and covered with wire-gauze, and a screw-thread cut upon its tubular top section.

A represents the water-section, which is cast of malleable iron in one piece. The point $a^1$ is made conical, and the portion above the point $a^1$ consists of alternate contracting and expanding ring-sections $a^2\ a^3$. In the contracting sections $a^2$ are formed elongated openings $a^4$ for the water to pass through, and these contracting sections are covered with wire-gauze B to prevent sand from passing into the pipe with the water. The expanding sections $a^3$ are left uncovered.

By this construction, when the tube is being driven the expanding sections $a^3$ force back any stones or other obstructions, so that they will not cut or tear the gauze B with which the contracting sections $a^2$ are covered, the surface of the wire-gauze contracting from the main line of the tube, so that the gauze will move away from the stones, &c., while the tube is being driven.

The upper section $a^5$ is made tubular, and has a screw-thread cut upon its upper part. The section $a^5$ has longitudinal ribs $a^6$—three, four, or more—cast upon its inner surface to strengthen it and prevent it from being crushed when cutting the screw-thread upon it, and more particularly to strengthen it while driving.

Having thus described my invention, I claim as new and desire to secure by Letters Patent—

A water-section, A, of a drive-well tube, cast of malleable iron with a conical point, $a^1$, alternate contracting and expanding ring-sections $a^2\ a^3$, and a tubular top section, $a^5$, and having its contracting sections $a^2$ perforated and covered with wire-gauze B, and a screw-thread cut upon its tubular top section $a^5$, substantially as herein shown and described.

ALPHONSO WILSON.

Witnesses:
FRANK B. CLARK,
JOSEPH B. COWARD.